United States Patent [19]

Takahashi et al.

[11] Patent Number: 4,834,203
[45] Date of Patent: May 30, 1989

[54] ELECTRIC POWER STEERING SYSTEM

[75] Inventors: Tsutomu Takahashi, Ohta; Shinji Itou, Oomama; Saiichiro Oshita; Toyohiko Mouri, both of Ohta, all of Japan

[73] Assignee: Fuji Jukogyo Kabushiki Kaisha, Tokyo, Japan

[21] Appl. No.: 213,111

[22] Filed: Jun. 29, 1988

[30] Foreign Application Priority Data

Jul. 2, 1987 [JP] Japan ................... 62-166201

[51] Int. Cl.⁴ ............................. B62D 5/04
[52] U.S. Cl. .................. 180/79.1; 364/424.01
[58] Field of Search ........... 180/79.1, 142, 141; 74/388 PS; 364/424.01

[56] References Cited

U.S. PATENT DOCUMENTS 4,664,211 5/1987 Oshita et al. ............... 180/79.1
4,735,271 4/1988 Shimizu ..................... 180/79.1

FOREIGN PATENT DOCUMENTS 61-98675 5/1986 Japan .

*Primary Examiner*—John A. Pekar
*Attorney, Agent, or Firm*—Martin A. Farber

[57] ABSTRACT

An electric power steering system has a torsion torque sensor provided for detecting torsion torque generating in a steering system of a motor vehicle, for providing an assist signal for driving a motor to turn a steering wheel. A steering angle sensor is provided for detecting steering angle of the steering wheel and for producing a steering angle signal. In response to the steering angle signal, a return torque signal is produced for steering wheel. A vehicle speed sensor is provided for producing a vehicle speed signal dependent on speed of the vehicle, and a calculator is provided calculating lateral acceleration impared to the vehicle and for producing a lateral-acceleration-dependent-return torque signal. In accordance with the vehicle speed signal, the lateral-acceleration-dependent-return torque signal is corrected to produce return torque correcting signal, the absolute value of which reduces with increase of vehicle speed. The return torque correcting signal is added to the return torque signal for correcting the latter signal.

3 Claims, 8 Drawing Sheets

ELECTRIC POWER STEERING SYSTEM

BACKGROUND OF THE INVENTION

The present invention relates to an electric power steering system for a motor vehicle, and more particularly to a system for controlling a return torque in accordance with driving conditions of the vehicle.

U.S. Pat. No. 4,664,211 (Japanese Patent Laid Open No. 61-132465) discloses an electric power steering system. The system is provided for producing an assist signal dependent on the torsion torque signal from a torsion torque sensor and on the vehicle speed, an auxiliary assist signal dependent on the differentiation of the torsion torque signal, a return torque signal depending on a steering angle signal from a steering angle sensor, for returning the steering wheel to a neutral position, and a damping signal depending on the differentiation of the steering angle signal. These signals are added for controlling an electric motor.

In the steering system, the return signal is determined only by the steering angle signal. Accordingly, if the return signal is set to provide a sufficient return torque when the lateral acceleration exerted on the motor vehicle during cornering is in a low range, when the lateral acceleration is high during cornering at a low or middle vehicle speed, the return starting speed of the steering wheel becomes insufficient, resulting in delay of the returning of the steering wheel. In order to eliminate such a disadvantage, the applicant proposed a system for correcting the return torque in accordance with the lateral acceleration.

However, the system is arranged to correct the return torque by a correcting value only dependent on the lateral acceleration. At cornering at a high vehicle speed, the lateral acceleration becomes high, so that a large correcting value is added to the return torque in spite of a small steering angle. As a result, the return torque becomes excessively large.

SUMMARY OF THE INVENTION

The object of the present invention is to provide a system which provides a proper return torque in accordance with vehicle speed.

According to the present invention, there is provided an electric power steering system having a motor operatively connected to a steering system of a motor vehicle for reducing steering effort, a torsion torque sensor provided for detecting torsion torque generating in the steering system in steering operation, assist means responsive to the output signal of the torsion torque sensor for producing an assist signal, driving means responsive to the assist signal for producing a signal for driving the motor to turn a steering wheel, a steering angle sensor provided for detecting steering angle of the steering wheel and for producing a steering angle signal, return means responsive to the steering angle signal for producing a return torque signal for operating the motor to return the steering wheel.

The system comprises a vehicle speed sensor for producing a vehicle speed signal dependent on speed of the vehicle, detecting means for detecting lateral acceleration produced at cornering of the vehicle and for producing a lateral-acceleration-dependent-return torque signal, correcting means responsive to the vehicle speed signal for correcting the lateral-acceleration-dependent-return torque signal and for producing a return torque correcting signal, the absolute value of which reduces with increase of the vehicle speed, adding means for adding the return torque correcting signal to the return torque signal for correcting the latter signal.

In an aspect of the invention, the detecting means comprises means for calculating the lateral acceleration based on the steering angle signal and the vehicle speed signal, and the correcting means includes a table storing a coefficient which reduces with increase of the vehicle speed.

The other objects and features of this invention will become understood from the following description with reference to the accompanying drawings.

DETAILED DESCRIPTION OF THE PREFERRED EMBODIMENT

Figure 1:
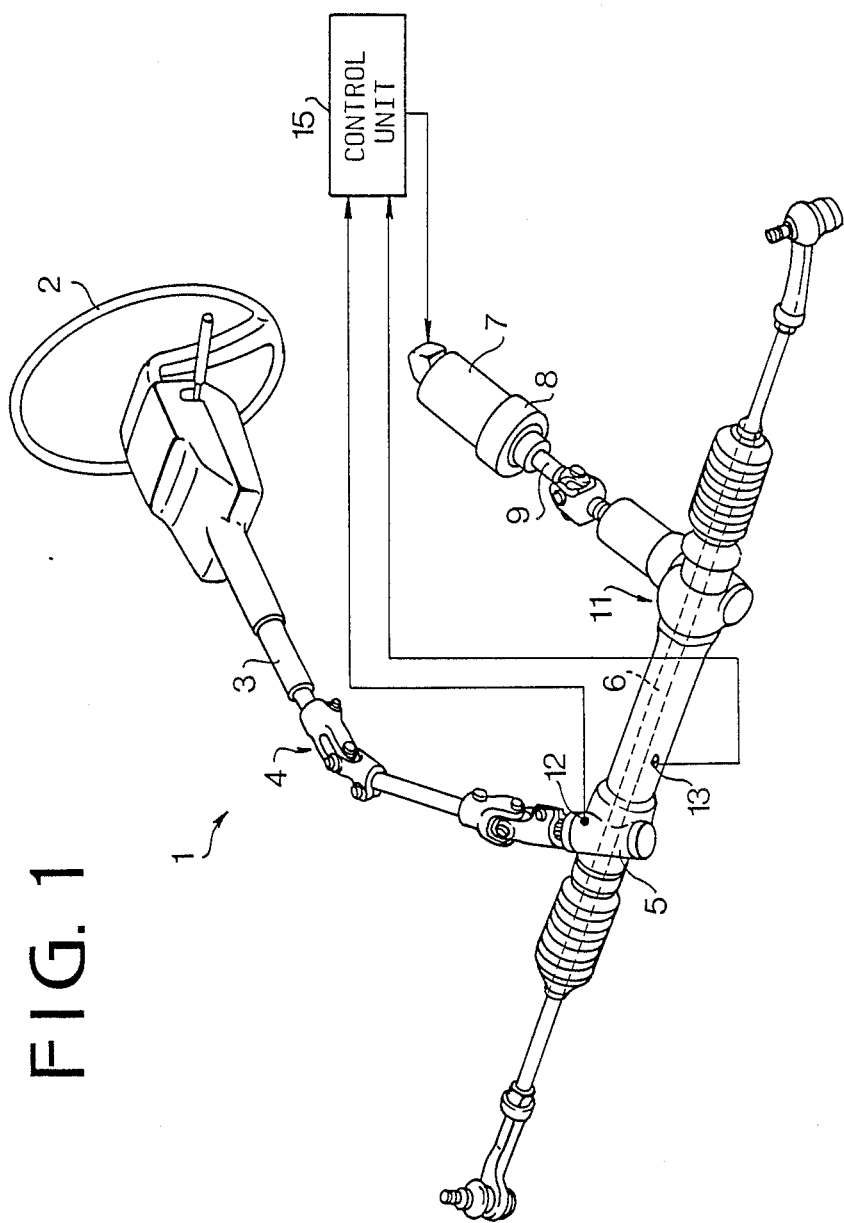
FIG. 1 is a perspective view showing a power steering system to which the present invention is applied.

Referring to FIG. 1, a steering system 1 is a rack-and-pinion type and comprises a steering wheel 2, steering shaft 3, joint 4, gear box 5, and rack 6. Another rack-and-pinion device 11 is provided for an electric power steering. A pinion of the device 11 is engaged with the rack 6. The pinion is operatively connected with an output shaft 9 of a reduction gear device 8 attached to a motor 7. A torsion torque sensor 12 is provided on gear box 5 for measuring the torsion torque of the steering shaft, and a steering angle sensor 13 is provided adjacent to the rack 6 so as to measure the axial movement of the rack 6 corresponding to the steering angle. Outputs of the sensors 12 and 13 are applied to a control unit 15 of the present invention.

Figure 2A:
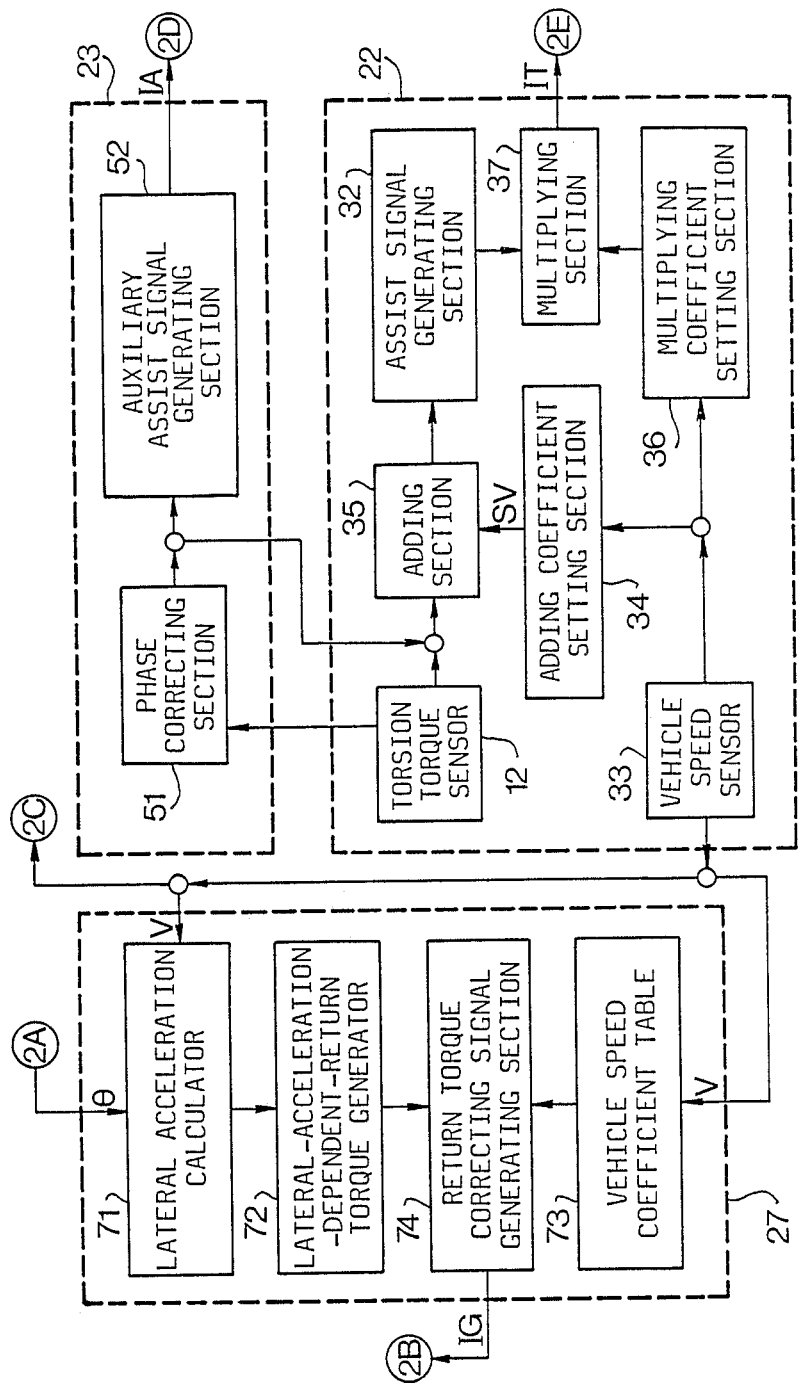
FIG. 2a and 2b are a block diagram of a system according to the present invention.
Figure 2B:
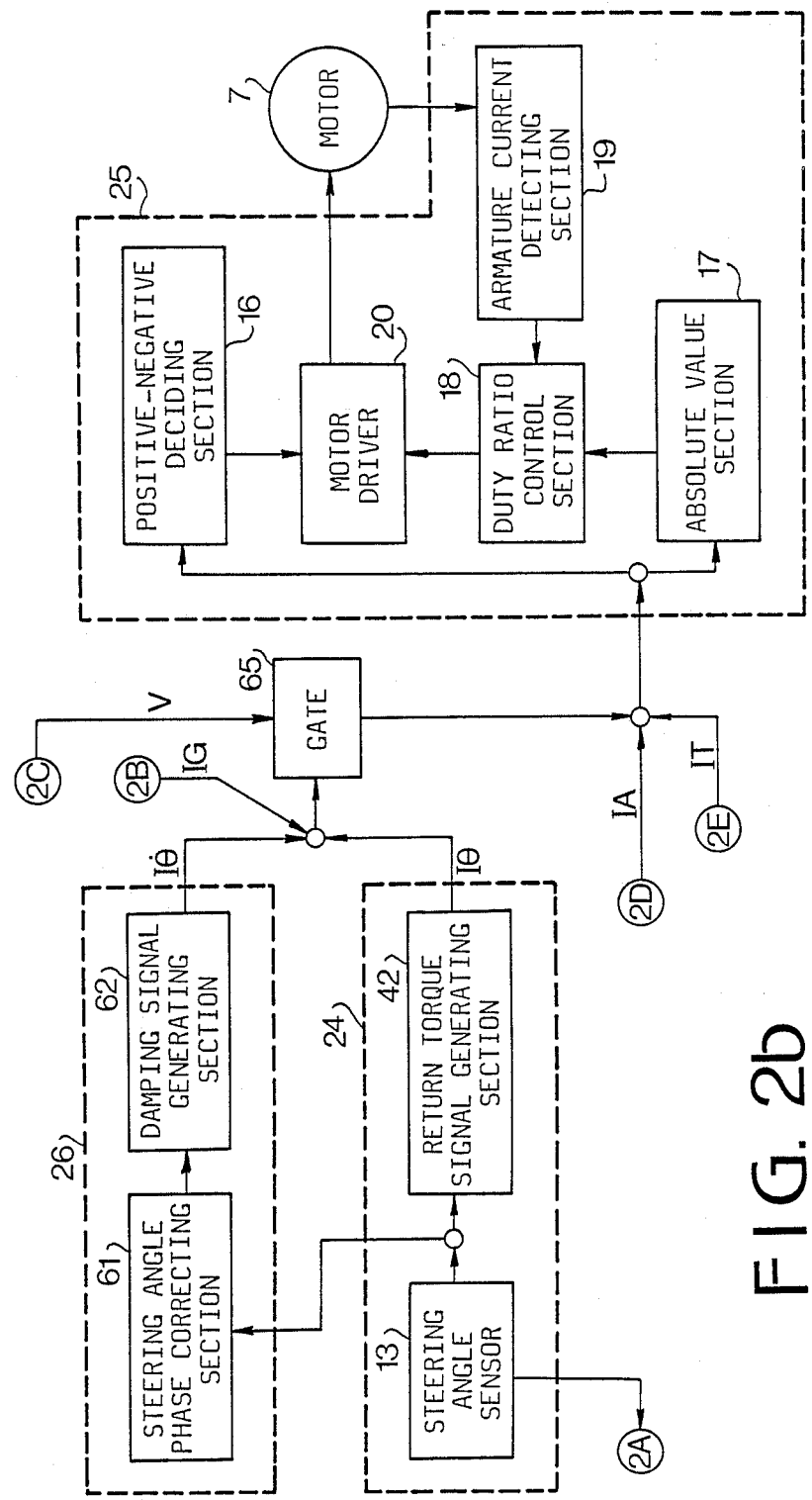

FIGS. 2a and 2b show the control unit 15 which comprises an assist command section 22, auxiliary assist command section 23, return command section 24, damping command section 26, drive control section 25, and return torque correcting section 27.

Figure 3:
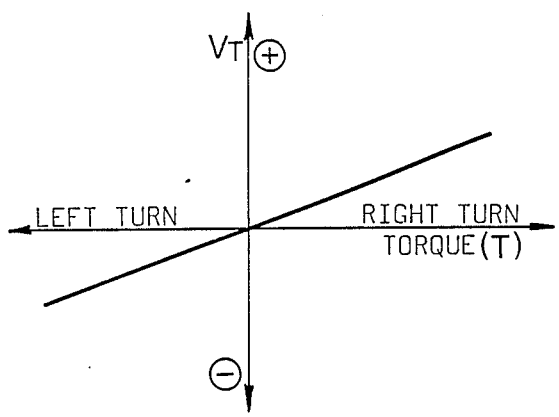
FIG. 3 is a graph showing an output characteristic of a torsion torque sensor.
Figure 4:
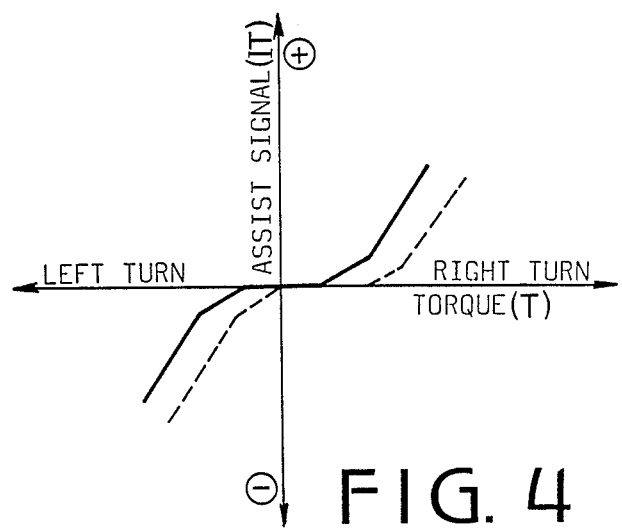
FIG. 4 is a graph showing characteristic of assist signals.
Figure 5:
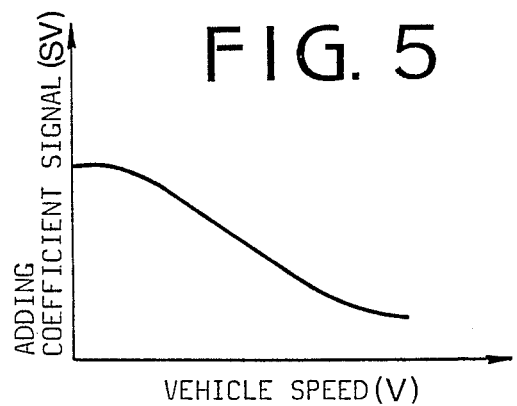
FIG. 5 is a graph showing a characteristic of an adding coefficient signal.

The assist command section 22 comprises the torsion torque sensor 12 and a vehicle speed sensor 33. The torsion torque sensor 12 produces an output signal representing the torsion torque and the direction of the torsion at the steering shaft as shown in FIG. 3. The output signal of the vehicle speed sensor 33 is applied to an adding coefficient setting section 34 and a multiplying coefficient setting section 36. The adding coefficient signal from the section 34 decreases as the vehicle speed increases (FIG. 5). Outputs of the torsion torque sensor 12 and adding coefficient setting section 34 are added at an adding section 35 the output of which is applied to an assist signal generating section 32. The assist signal IT generates from the section 32, when the torsion torque rises above a predetermined value and has a polarity dependent on the torsion torque direction of the steering shaft as shown in FIG. 4 (solid line). In accordance with the value of the adding coefficient signal SV, the assist signal IT is shifted along the X-axis as shown by solid lines in FIG. 6.

Figure 6:
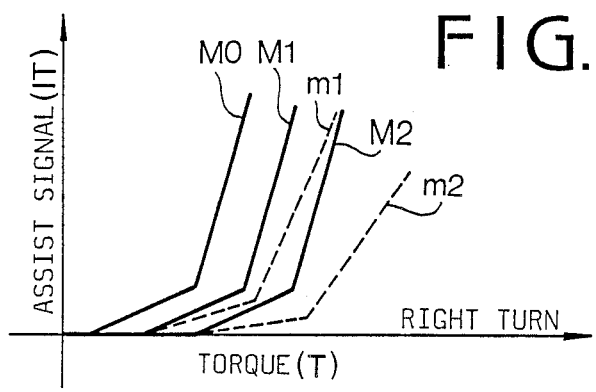
FIG. 6 is a graph showing the variation of the assist signal.
Figure 7:
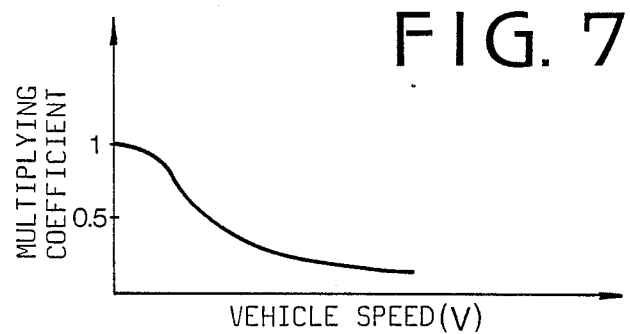
FIG. 7 is a graph of a multiplication coefficient.

FIG. 6 shows assist signals at the right turn. The value of assist signal decreases with the increase of the vehicle speed at the same torsion torque (from line $M_0$ to $M_1$, $M_2$ in FIG. 6) and increases with the increase of the torsion torque. On the other hand, the multiplying coefficient signal from the section 36 decreases with the increase of the vehicle speed (FIG. 7). The assist signal IT is multiplied by the multiplying coefficient at a multiplying section 37, so that the assist signal is corrected as shown by dotted line in FIG. 6.

Figure 9:
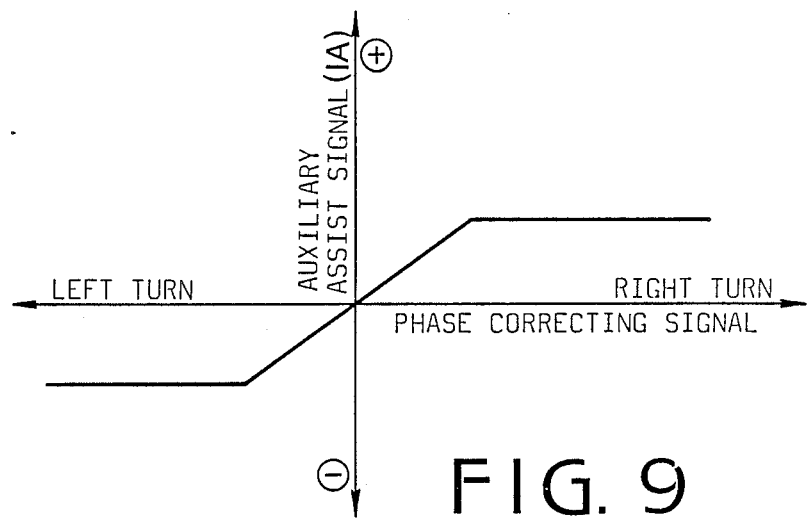
FIG. 9 is a graph showing an auxiliary assist signal.

The auxiliary assist command section 23 comprises a phase correcting section 51 applied with the output of torsion torque sensor 12 for producing an output which is proportional to the differentiation of the output of the sensor 12. Namely, the output of the section 51 represents the speed of the variation of the torsion torque. The output of the phase correcting section 51 is applied to an auxiliary assist signal generating section 52 to produce an auxiliary assist signal IA (FIG. 9). The output signal of the section 51 is also added to the output of the torsion torque sensor 12 and fed to the adding section 35, thereby correcting the phase of the assist signal to meet the operation of the motor 7.

Figure 8:
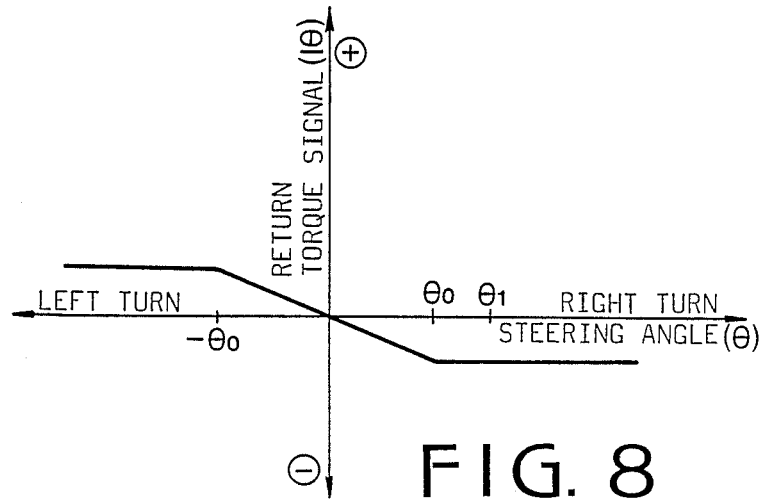
FIG. 8 is a graph of a characteristic of a return torque signal.

The return command section 24 includes the steering angle sensor 13 the output signal of which is applied to a return torque signal generating section 42. The section 42 generates a return torque signal $I\theta$ dependent on the steering angle (FIG. 8).

The damping command section 26 has a steering angle phase correcting section 61 applied with the signal from the steering angle sensor 13 for producing an output which is proportional to the differentiation of the output of the sensor 13, and a damping signal generating section 62 responsive to the output of the section 61 for producing a damping signal $I\dot{\theta}$.

Figure 10:
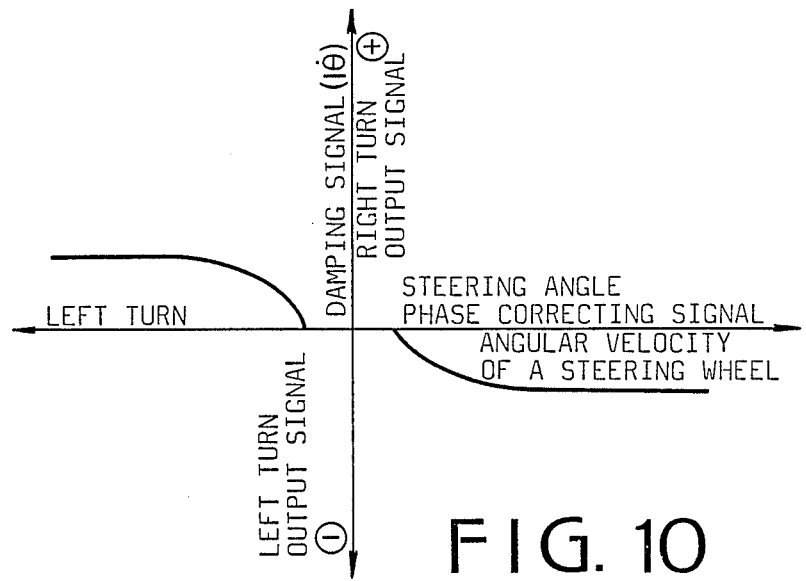
FIG. 10 is a graph showing a damping signal.

As shown in FIG. 10, the damping signal generates when the steering angular velocity exceeds a predetermined small value, and increases with the increase of the steering angular velocity. When the steering angular velocity exceeds a predetermined large value, the damping signal becomes constant. The polarity (direction) of the damping signal is the reverse of the polarity (direction) of the rotate of the steering wheel.

Figure 13:
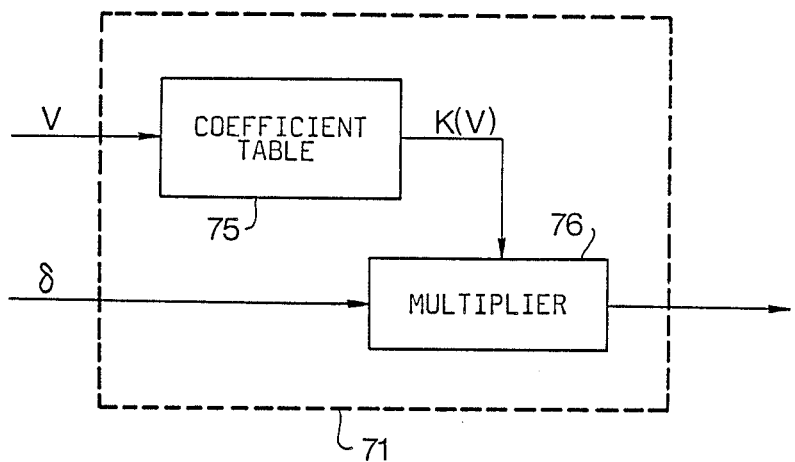
FIG. 13 is a block diagram of a lateral acceleration calculator.

The return torque correcting section 27 comprises a lateral acceleration calculator 71 and a lateral-acceleration-dependent-return torque generator 72. As shown in FIG. 13 the lateral acceleration calculator 71 has a lateral acceleration coefficient table 75 in a form of a one dimensional table and a multiplier 76. The table 75 stores a plurality of coefficients K for the lateral acceleration G in accordance with input vehicle speed V from the vehicle speed sensor 33 The multiplier 76 multiplies the steering angle $\theta$ from the steering angle sensor 13 and the coefficient K derived from the table 75 together to produce a lateral acceleration G, as follows $$G = (1/9 \cdot 8)[V^2/(1 + AV^2)](1/l)\theta = K'(V) \cdot \theta$$

where
A is a stability factor,
l is a wheelbase of the vehicle.

The lateral-acceleration-dependent-return torque generator 72 produces a return torque dependent on the lateral acceleration G.

Figure 11:
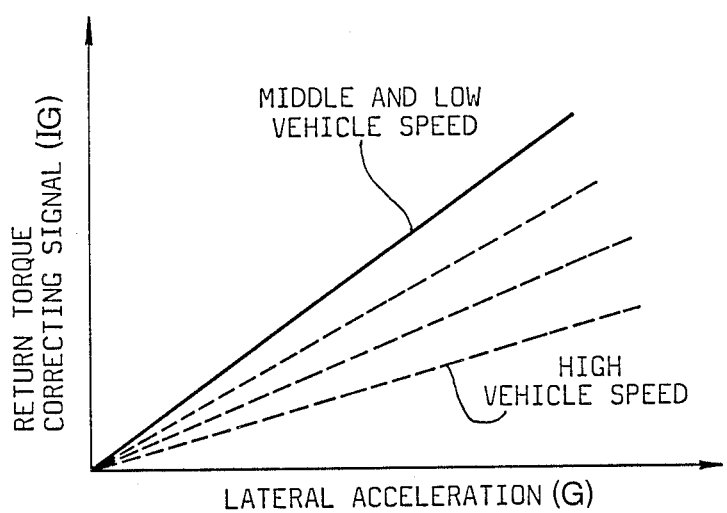
FIG. 11 is a graph showing characteristics of return torque correcting signal.
Figure 12:
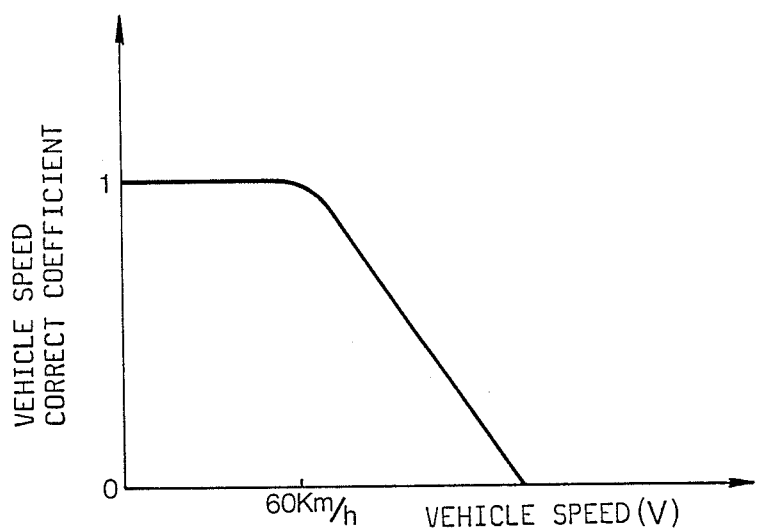
FIG. 12 is a graph showing a vehicle speed correct coefficient.

The return torque correcting section 27 has further a vehicle speed coefficient table 73 and a return torque correcting signal generating section 74. The vehicle speed coefficient table 73 stores a plurality of coefficients dependent on vehicle speed. As shown in FIG. 12, the coefficient is one from zero to 60 Km/h and reduces with increase of vehicle speed. The section 74 operates to multiply the return torque from the return torque generator 72 and the vehicle speed coefficient derived from the table 73 together to generate a return torque correcting signal IG. The polarity (direction) of the return torque correcting signal IG is the same as that of the return torque signal $I\theta$. As shown in FIG. 11, the absolute value of the return torque correcting signal IG reduces with increase of vehicle speed.

The damping signal $I\dot{\theta}$ and the return torque correcting signal IG are added to the return torque signal $I\theta$ from the section 42 The summation of both signals are fed to a gate 65 which opens to pass the summation when the vehicle speed exceeds a predetermined speed, for example 5 Km/h.

The assist signal IT, auxiliary assist signal IA, and the summation of signals $I\theta$, $I\dot{\theta}$ and IG are added and the summation is applied to a positive-negative deciding section 16 and an absolute value section 17 of the drive control section 25. The output of the positive-negative deciding section 16 is applied to the motor 7 through a motor driver 20. The output signal of the absolute value section 17 is applied to a duty ratio control section 18 which produces a pulse train. The pulse train is applied to the driver 20 so that the output torque of the motor 7 is controlled by the duty ratio of the pulse train. The output torque of the motor is fed back to the duty ratio control section 18 by an armature current detecting section 19.

When a torsion torque generates by steering operation, an assist signal IT generates from the assist command section 22. The polarity and absolute value of the assist signal is detected and duty ratio is decided in accordance with the absolute value by the drive control section 25, so that the output torque of motor 7 is controlled to reduce the steering effort As shown in FIG. 4 (solid line), since the assist signal increases with the increase of the torsion torque, the steering effort is properly reduced in accordance with the torsion torque.

As described above, the assist signal changes with the variation of the output of the vehicle speed sensor 33. Referring to FIG. 6, reference Mo designates an assist signal at vehicle speed of zero on the right turn of the steering wheel, and Ml and M2 are at higher speed which are parallely moved along the X-axis. Assist signals Ml and M2 are further changed to signals ml and m2 each having a small inclination by multiplying the signals by the multiplying coefficient from the section 36. Accordingly, the assist signal decreases with the increase of vehicle speed. Therefore, adequate steering effort is required to steer at higher vehicle speed, thereby preventing the occurrence of uneasiness in the drive.

On the other hand, return command section 24 produces a return torque signal $I\theta$ having a characteristic of FIG. 8. The absolute value of return torque signal $I\theta$ increases with the increase of the steering angle $\theta$ until a predetermined angle $\pm\theta_o$ after which it has a constant value. For example, when the steering angle is held at an angle $\theta 1$ for right turn, the motor 7 is controlled by the sum of a positive assist signal IT of section 23 and a negative return signal $I\theta$. The sum of both signals is shown by dotted line in FIG. 4. Accordingly, if the steering wheel is released, the torsion torque largely decreases, so that the summation of both signals has a negative value for the left turning. As a result, the motor 7 produces an output torque in the left turning direction so that frictions in the steering system and inertial moment of the motor are reduced. Thus, the steering wheel can be easily returned to straight ahead with the aid of the caster effect. Since the return torque correcting signal IG increases with increase of lateral acceleration G and reduces with increase of vehicle speed, proper return torque is provided in accordance with vehicle speed.

When the steering wheel is turned in stationary state of a vehicle, the torsion torque increases rapidly because of large friction between tires and the ground. The speed of the rapid increase of torque is detected by phase correcting section 51 and the output thereof is added to the output of the sensor 12. Accordingly, an assist signal IT is immediately applied to drive control section 22 so as to operate the motor 7 without delay.

In response to the output of the phase correcting section 51, the auxiliary assist signal generating section 52 generates an auxiliary assist signal IA shown in FIG. 9. The auxiliary assist signal IA is also added to the assist signal IT. Accordingly, the output torque of the motor immediately assists the steering effort.

When the steering wheel is quickly turned a small angle during the driving of the vehicle, the rotational speed of the steering angle $\theta$ is detected by steering angle phase correcting section 61. The output of the section 61 is applied to damping signal generating section 62 which produces a damping signal $I\theta$ shown in FIG. 10. The damping signal $I\theta$ is added to the assist signal IT to reduce it. Accordingly, the output of the motor 7 is reduced, thereby increasing the steering effort. Thus, the occurrence of uneasiness at quick steering operation can be prevented.

At cornering, the lateral acceleration calculator 71 calculates the lateral acceleration produced at cornering of the vehicle, based on the steering angle and the vehicle speed, and the return torque dependent on the calculated lateral acceleration is generated from the generator 72. When the vehicle speed is below 60 Km/h, the coefficient from the table 73 is one. Accordingly, a return torque signal is produced from the generating section without changing the return torque from the generator 72. The absolute value of the return torque signal reduces with increase of the vehicle speed. Thus, a proper return torque is provided in accordance with vehicle speed.

While the presently preferred embodiment of the present invention has been shown and described, it is to be understood that this disclosure is for the purpose of illustration and that various changes and modifications may be made without departing from scope of the invention as set forth in the appended claims.

What is claimed is:

1. In an electric power steering system having a motor operatively connected to a steering system of a motor vehicle for reducing steering effort, a torsion torque sensor provided for detecting torsion torque generating in the steering system in steering operation, assist means responsive to the output signal of the torsion torque sensor for producing an assist signal, driving means responsive to the assist signal for producing a signal for driving the motor to turn a steering wheel, a steering angle sensor provided for detecting steering angle of the steering wheel and for producing a steering angle signal, return means responsive to the steering angle signal for producing a return torque signal for operating the motor to return the steering wheel, the improvement comprising:

a vehicle speed sensor for producing a vehicle speed signal dependent on speed of the vehicle;

detecting means for detecting lateral acceleration imparted to the vehicle, and for producing a lateral-acceleration-dependent-return torque signal;

correcting means responsive to the vehicle speed signal for correcting the lateral-acceleration-dependent-return torque signal and for producing a return torque correcting signal, the absolute value of which reduces with increase of the vehicle speed;

adding means for adding the return torque correcting signal to the return torque signal for correcting the latter signal.

2. The system according to claim 1 wherein the detecting means comprises means for calculating the lateral acceleration based on the steering angle signal and the vehicle speed signal.

3. The system according to claim 1 wherein the correcting means includes a table storing a coefficient which reduces with increase of the vehicle speed.

* * * * *